United States Patent
Tsirkin (10) Patent No.: US 11,586,727 B2
(45) Date of Patent: Feb. 21, 2023

(54) SYSTEMS AND METHODS FOR PREVENTING KERNEL STALLING ATTACKS

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 24 days.

(21) Appl. No.: 17/216,188

(22) Filed: Mar. 29, 2021

(65) Prior Publication Data

US 2022/0309150 A1  Sep. 29, 2022

(51) Int. Cl.
*G06F 21/00*  (2013.01)
*G06F 21/53*  (2013.01)

(52) U.S. Cl.
CPC ........ *G06F 21/53* (2013.01); *G06F 2221/033* (2013.01)

(58) Field of Classification Search
CPC ............................ G06F 21/53; G06F 2221/033
See application file for complete search history.

(56) References Cited

U.S. PATENT DOCUMENTS

| | | | |
|---|---|---|---|
| 9,164,843 B1 | 10/2015 | Havemose | |
| 9,455,914 B2 | 9/2016 | Singh et al. | |
| 10,324,795 B2 | 6/2019 | Yang et al. | |
| 10,372,550 B1 | 8/2019 | Backensto et al. | |
| 10,515,023 B2 | 12/2019 | Sahita et al. | |
| 2003/0135789 A1* | 7/2003 | DeWitt, Jr. | G06F 11/3636 714/E11.212 |
| 2006/0031940 A1* | 2/2006 | Rozman | G06F 21/53 726/27 |
| 2007/0061810 A1* | 3/2007 | Mehaffy | G06F 9/30072 718/104 |
| 2010/0043072 A1* | 2/2010 | Rothwell | G06F 21/566 726/24 |
| 2017/0134403 A1* | 5/2017 | Hearn | H04L 63/1425 |
| 2019/0243966 A1* | 8/2019 | Wei | G06F 12/1009 |
| 2020/0065013 A1* | 2/2020 | Griffith | G06F 3/0604 |
| 2020/0210568 A1* | 7/2020 | Strogov | G06N 20/00 |
| 2020/0364101 A1* | 11/2020 | Bottomley | G06F 9/468 |

OTHER PUBLICATIONS

Jurczyk, M. et al., "Identifying and Exploiting Windows Kernel Race Conditions via Memory Access Patterns"; Apr. 2013; 69 pages; downloaded from https://static.googleusercontent.com/media/research.google.com/en//pubs/archive/42189.pdf.

Rouzaud-Cornabas, J. et al., "An Information Flow Approach for Preventing Race Conditions: Dynamic Protection of the Linux OS"; 2010 Fourth International Conference on Emergency Security Information, Systems and Technologies; Jul. 2010; pp. 11-16; downloaded from https://ieeexplore.ieee.org/document/5633385.

* cited by examiner

*Primary Examiner* — Ghazal B Shehni
(74) *Attorney, Agent, or Firm* — Lowenstein Sandler LLP (57) ABSTRACT

Systems and methods for preventing kernel stalling attacks. An example method may comprise receiving, by a kernel, an address range associated with a data store of an application program; mapping, by the kernel, a portion of random access memory (RAM) to the address range; disabling page fault handling with respect to addresses falling within the address range; and responsive to receiving, from the application program, a memory access request specifying an address outside of the address range, returning a memory access error to the application program.

17 Claims, 6 Drawing Sheets

SYSTEMS AND METHODS FOR PREVENTING KERNEL STALLING ATTACKS

TECHNICAL FIELD

The present disclosure is generally related to virtualized computer systems, and more particularly, to preventing the kernel from stalling due to malicious attacks.

BACKGROUND

Modern computer systems include memory management features that provide memory protection. The memory management features may restrict particular processes from accessing particular portions of memory. The restriction may be enforced using a combination of hardware features and kernel features that work together to enable or restrict an executing process from accessing memory resources. The memory resources are often separated into user space and kernel space and when a user space process attempts to access memory resources in kernel space the memory management features may generate a segmentation fault. The segmentation fault may indicate that an access violation occurred so that it can be handled accordingly.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for preventing the kernel from stalling due to malicious third party actions.

Modern computer systems may include memory virtualization features that contain security enhancements to reduce the computer systems' vulnerability to attack. An example of a security enhancement involves segregating virtual memory into kernel space and user space. The kernel space may be reserved for running a privileged operating system kernel, kernel extensions, and most device drivers. The user space may be a memory area where application software (e.g., application programs) and some drivers execute. Memory virtualization details are often implemented by features of a kernel and may be hidden from a processing thread executing in user space. Application programs running on the computer system may communicate with the kernel using system calls. A system call is a programmatic way in which an application program may request a service from the kernel. For example, in response to a request by the application program through a system call, the kernel may provide services such as memory management, process management, file management, and input/output (I/O) management.

In current computer systems, in response to the kernel receiving a request to access the user space (memory) via a system call, the kernel may first verify whether the application program attempting to access the memory location has permission to access the memory location. For example, the kernel may determine that the pointer associated with the memory access request received includes a restricted address, such as an address associated with the kernel space or another application program's user space. A pointer is an object (e.g., variable, data structure, function, etc.) that can store a memory address from which data is to be read or to which data of one or more data streams is to being programmed (written). If the pointer does include a restricted address, the kernel may generate a segmentation fault (e.g., a memory access violation error), which is a failure condition notifying the operating system that the application program attempted to access a restricted area of memory. Otherwise, the kernel may process the memory access request. When the user application requests access to a portion of virtual memory that is not present in (loaded into) physical memory, the underlying hardware may generate a hardware event (e.g., page fault). The kernel may detect the hardware event and handle the hardware event by retrieving the requested portion of virtual memory from a secondary storage device (e.g., swap space of a hard disk). The process of detecting the hardware events and retrieving the data corresponding to the portion of virtual memory is often handled by the kernel and is typically hidden from user space processing threads.

However, in some instances, malicious software may intentionally trigger a hardware event, such as a page fault, by using a system call to target data stored on the hard disk. Since retrieving data from the hard disk is a relatively lengthy process, triggering a series of page faults may allow the malicious software to effectively stall the kernel while the kernel processes the page faults. Stalling the kernel renders it unresponsive and, thus, inaccessible to other computer applications, which can be considered as a denial-of-service (DoS) situation.

Aspects of the present disclosure address the above and other deficiencies by providing technology that can protect the kernel from malicious stalling attacks. In particular, aspects of the present disclosure enable an application program to first generate a memory buffer in user space. The buffer may be used for system calls generated by the application program. The application program can send a virtual address range of the memory buffer to the kernel and indicate to the kernel that the parameters of all system calls generated by the application program should reside within the buffer. The kernel can first perform a verification check on the memory buffer. The verification check can include determining that the size of the memory buffer is below a threshold criterion (e.g., below a memory size value), is within a permissible address range (e.g., within the application program's allowable user space). Once the buffer is validated, the kernel may map a portion of random access memory (RAM) to the address range of the memory buffer. With the address range mapped to the RAM, the kernel can disable page fault handling with respect to the virtual addresses within the address range. By mapping the address range to the RAM, the kernel may ensure that any valid system call from the application program would not require a page fault to retrieve data from a hard disk. In one example, the kernel may disable page fault handling by pinning memory pages associated with the virtual memory addresses using a pinning function. Pinning the memory pages prevents the memory pages from being evicted from the RAM. Thus, pinning the memory pages disables page fault handling with respect to the memory pages associated with the virtual addresses, which the kernel prevents itself from triggering a hardware event, such as a page fault to retrieve a requested portion of virtual memory from a cache in a hard disk.

The application program may copy parameter values to the memory buffer. The application program may then invoke a system call referencing the addresses associated with the parameter values. The kernel may validate the addresses referenced by the system call against the address range of the reserved memory buffer. In response to the addresses being within the address range, the kernel may execute the system call. In response to the system call referencing an address outside the address range of the memory buffer, the kernel may return a memory access error to the application program. Additionally, in response to the system call referencing addresses inside the address range of the memory buffer, but a memory page is not present for a referenced address, the kernel may also return a memory access error to the application program without handling the page fault, thus ensuring that the application program cannot stall the kernel. Accordingly, aspects of the present disclosure protect the kernel from intentionally stalling due to malicious attacks.

Various aspects of the above referenced methods and systems are described in details herein below by way of examples, rather than by way of limitation. The examples provided below discuss a computer system where the computing processes may be managed by aspects of a kernel, a hypervisor, a host operating system, a virtual machine, or a combination thereof. In other examples, the computing processes may be performed in a computer system that is absent a hypervisor or other hardware virtualization features (e.g., virtual machines) discussed below.

Figure 1:
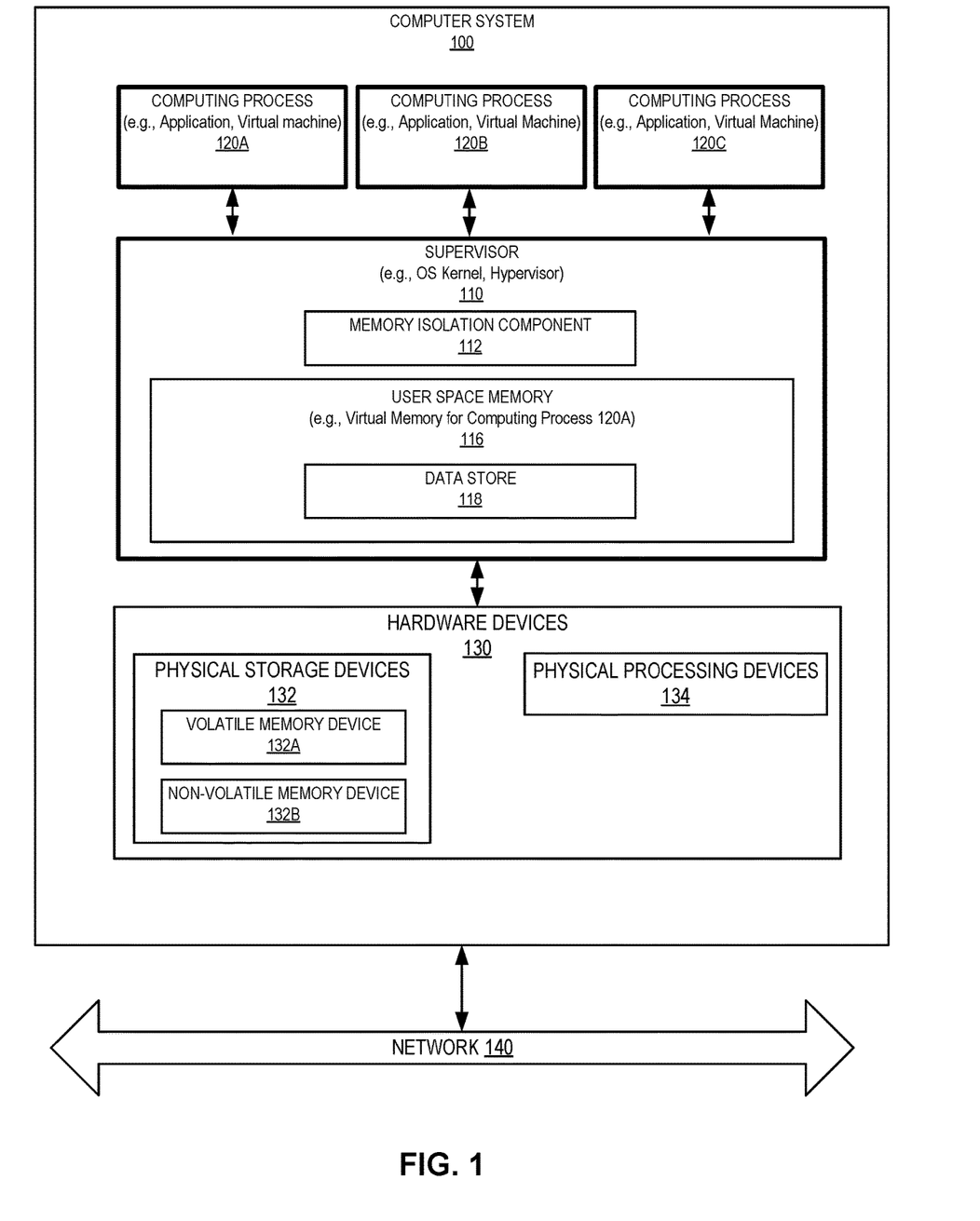
FIG. 1 depicts a high-level block diagram of an example computing system that provides memory isolation for a computing process, in accordance with one or more aspects of the present disclosure.

FIG. 1 depicts an illustrative architecture of elements of a computing system 100, in accordance with an embodiment of the present disclosure. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include a supervisor 110, computing processes 120A-C, computing resources 130, and a network 140.

Supervisor 110 may manage the execution of one or more computing processes and provide the computing processes with access to one or more underlying computing devices (e.g., hardware or virtualized resources). Supervisor 110 may be the same or similar to a kernel and may be a part of an operating system, hypervisor, or a combination thereof. Supervisor 110 may interact with hardware devices 130 and provide hardware virtualization, operating-system virtualization, other virtualization, or a combination thereof. Hardware virtualization may involve the creation of one or more virtual machines that emulate an instance of a physical computing machine. Operating-system-level virtualization may involve the creation of one or more containers that emulate an instance of an operating system. In one example, supervisor 110 may be part of a non-virtualized operating system that is absent hardware virtualization and operating-system-level virtualization and each of the computing processes 120A-C may be an application process managed by the non-virtualized operating system. In another example, supervisor 110 may be a hypervisor or include hypervisor functionality and each of computing processes 120A-C may execute within a separate virtual machine or container. In either example, the supervisor may be implemented as part of a kernel and execute as one or more processes in kernel space (e.g., privileged mode, kernel mode, root mode).

In the example, shown in FIG. 1, supervisor 110 may include memory isolation component 112. Memory isolation component 112 may enable supervisor 110 to manage access to user space memory 116 by disabling hardware event handling (e.g., page fault handling) during a system call and restricting supervisor 110 from accessing user space memory outside of a selected address range. Memory isolation component 112 is discussed in more detail in regards to FIG. 2 and may be used individually or in combination to provide enhanced memory management features for computing processes 120A-C.

Computing processes 120A-C may include a sequence of instructions that can be executed by one or more processing devices (e.g., physical processing devices 134). A computing process may be managed by supervisor 110 or may be a part of supervisor 110. For example, supervisor 110 may execute as one or more computing processes that cooperate to manage resource accessed by computing processes 120A-C. Each computing process may include one or more threads, processes, other stream of executable instructions, or a combination thereof. A thread may any computer based "thread of execution" and may be the smallest sequence of programmed instructions managed by supervisor 110. A process may include one or more threads and may be an instance of an executable computer program.

Computing processes 120A-C may be associated with a particular level of privilege that may be the same or similar to protection levels (e.g., processor protection rings). The privilege level may indicate an access level of a computing process to computing devices (e.g., memory, processor, or other virtual or physical resources). There may be multiple different privilege levels assigned to the computing processes 120A-C. In one example, the privilege levels may correspond generally to a user mode (e.g., reduced privilege mode, non-root mode, non-privileged mode) and a supervisor mode (e.g., enhanced privilege mode, kernel mode, root mode). The computing process executing in user mode may access resources assigned to the computing processes and may be restricted from accessing resources associated with kernel space or with another user space process (e.g., other portion of user space). For example, each computing process may have its own address space protected from other computing processes. The supervisor mode may enable the computing process to access resources associated with the kernel space and the user space. In other examples, there may be a plurality of privilege levels, and the privilege levels may include a first level (e.g., ring 0) associated with a supervisor/kernel, a second and third level (e.g., ring 1-2), and a fourth level (e.g., ring 3) that may be associated with user space applications.

A computing process may be referred to as a user space process when the computing process is executing with a user mode privilege level. In one example, the privilege level associated with a computing process may change during execution and a computing process executing in user space (e.g., userland) may request and be subsequently granted enhanced privileges by supervisor 110. Modifying the privilege level is often associated with a context switch (e.g., system call or hypercall).

User space memory 116 may be a portion of virtual memory that is assigned to a particular computing process (e.g., 120A). The virtual memory may be managed by supervisor 110 and may be segregated into kernel space (not shown) and user space. The user space may be further segregated into individual portions that are assigned to respective computing processes 120A-C. To simplify the illustration, the portions of the user space assigned to computing process 120A is illustrated (e.g., user space memory 116) and the portions of user space assigned to computing processes 120B and 120C are not shown. During execution of computing process 120A, the user space memory 116 may be updated to add or remove executable data and non-executable data.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices 132A (e.g., random access memory (RAM)), non-volatile memory devices 132B (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
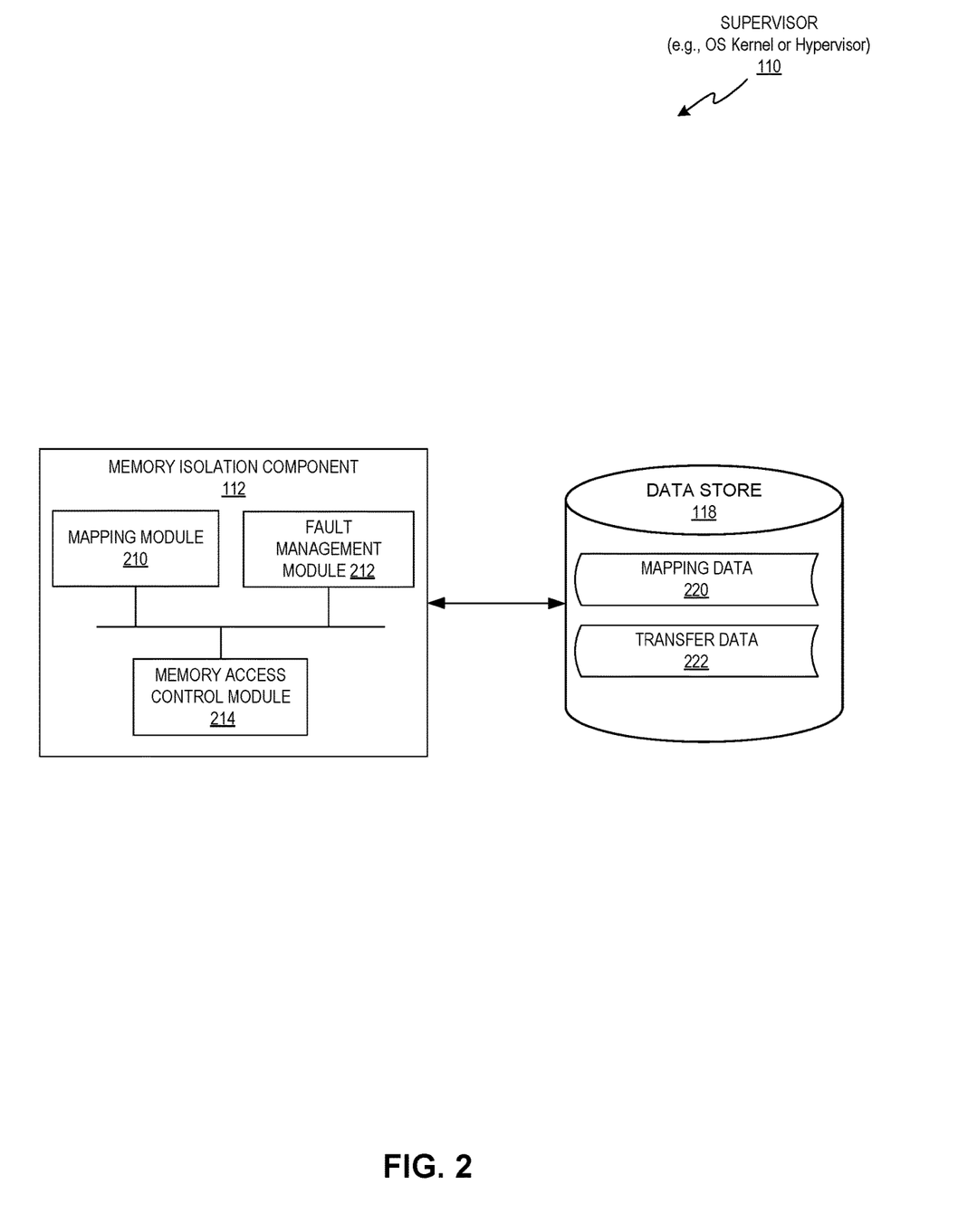
FIG. 2 depicts a block diagram illustrating components and modules of an example computer system, in accordance with one or more aspects of the present disclosure.

FIG. 2 depicts a block diagram illustrating an exemplary supervisor 110 that includes technology for providing memory isolation for a computing process, in accordance with one or more aspects of the present disclosure. Supervisor 110 may be the same or similar to supervisor 110 of FIG. 1 and may include memory isolation component 112, and a data store 230. The components and modules discussed herein may be performed by any portion of supervisor 110 (e.g., kernel/hypervisor) or by an application, virtual machine, other portion of a computing system, or a combination thereof. More or less components or modules may be included without loss of generality. For example, two or more of the modules may be combined into a single modules, or features of a module may be divided into two or more modules. In one implementation, one or more of the modules may reside on different computing devices (e.g., a client device and a server device).

Memory isolation component 112 may be a hardware or software component that enables supervisor 110 to manage access to a user space memory by disabling hardware event handling (e.g., page fault handling) during system calls and restricting supervisor 110 from accessing user space memory outside of a selected address range. In one example, memory isolation component 112 may include mapping module 210, fault management module 212, and memory access control module 214. Each module may include executable code to perform the one or more functions or processes discussed below. Data store 118, which may include mapping data 220 and transfer data 222, may be configured by supervisor 110 and/or computing process 120A-C. Data store 118 may be used for system calls generated by computing process 120A-C.

Mapping module 210 may enable supervisor 110 to configure a portion of the user space memory of a computing process for memory management. In some embodiments, configuring the portion of user space memory involves mapping virtual memory pages of the user space memory to a portion of volatile memory device 132A (e.g., RAM). For example, a computing process (e.g., computing process 120A, computing process 120B, computing process 120C, etc.) can generate data store 118 (e.g., a memory buffer) in user space (e.g., user space memory 116) and send one or more virtual address ranges relating to data store 118 to supervisor 110. The computing process may also indicate to the supervisor 110 that all system calls from the computing process are to be directed only towards data store 118. The virtual memory addresses may be related to an application (e.g., a web browser), a processing thread, a virtual machine, or any other computer software. In other embodiments, the virtual address range relating to data store 118 may be retrieved, by mapping module 210, from a configuration file, received from another computing process, etc.

Mapping module 210 may perform a verification check on data store 118. The verification check can include determining that the size of data store 118 is below a threshold criterion (e.g., below a memory size value), is within a permissible address range (e.g., within the computing process's allowable user space). Mapping module 210 may then map a portion of the physical memory (e.g., volatile memory device 132A) to the virtual memory addresses. To map the virtual memory addresses, mapping module 210 may configure one or more page table structures. The page table structures may include mapping data composed of multiple records, where each record correlates an address in user space memory (e.g., a virtual address to an address in physical memory (e.g., a physical address). Mapping module 210 may generate the page table structures or update existing page table structures. Updating the page tables may involve adding, removing, or replacing mapping data 220. Mapping data 220 may include permission data, location data, other data or a combination thereof. The permission data may indicate the permissions associated with particular locations in virtual memory and whether the data at the locations is executable, non-executable, privileged, non-privileged, or a combination thereof. The location data may identify one or more locations in virtual memory (e.g., virtual memory addresses) and one or more locations in physical memory (e.g., guest physical memory addresses or host physical memory addresses). In one example, the location data may include one-to-one mapping between a location in virtual memory and a location to physical memory. In another example, the location data may include many-to-one mapping and multiple locations in virtual memory may map to the same location in physical memory. In either example, the one or more page table structures may each be a nested page table structure comprising a mapping between a guest virtual memory addresses and host physical memory addresses.

Fault management module 212 may enable and disable one or more fault handling capabilities (e.g., page fault handling) of supervisor 110. In some embodiments, fault management module 212 may disable one or more fault handling capabilities of supervisor 110 in response to a system call from the computing process, and enable the one or more fault handling capabilities of supervisor 110 upon completion of the system call. In one example, fault management module 212 may disable fault handling capabilities by executing a pinning function (e.g., executing an "mlock( )" function) to pin memory pages associated with the virtual memory addresses to physical memory. To enable the fault handling capabilities, fault management module 212 may unpin the memory pages. In another example, a hardware element or software function may be used by fault management module 212 to disable and enable the fault handling capabilities of supervisor 110.

Memory access control module 214 may enable supervisor 110 to restrict or enable access to data associated with the memory access request from a system call. For example, the computing process may require memory access and copy parameter values to data store 118. The computing process may then invoke a system call referencing the addresses associated with the parameter values. Supervisor 110 may receive the system call and memory access control module 214 may determine whether a pointer associated with the system call include one or more addresses that are outside the address range of data store 118 (e.g., validate the addresses referenced by the system call against the address range of the reserved memory buffer). In response to the addresses being within the address range, memory access control module 214 may execute the system call. In response to determining that at least one address associated with the system call is outside the address range of data store 118, memory access control module 214 may return a memory access error to the computing process. The memory access error may indicate that supervisor 110 is unable to retrieve the requested data, that the requested data is restricted, that the supervisor 110 is unable to program (write) data to a storage device associated with the one or more addresses. In some embodiments, in response to the system call referencing one or more addresses inside the address range of data store 118, but a memory page is not present for the referenced address inside data store 118, memory access control module 214 can also return a memory access error to the computing process, In some embodiments, where the system call includes a request to retrieve data, in response to determining that each address associated with the system call is within the address range of data store 118, memory access control module 214 may retrieve the data from the addresses associated with the system call. In some embodiments, where the system call includes a request to program (write) data, in response to determining that each address associated with the system call is within the address range of data store 118, memory access control module 214 may program data to data store 118 as transfer data 222. Once the system call is processed, memory access control module 214 may unpin the memory pages of data store 118 and copy (page out) the data from data store 118 to a hard disk (e.g., non-volatile memory device 132B). memory access control module 214 may re-pin the memory pages in response to the completion of the page out, in response to another system call, etc.

In some embodiments, the processes performed by memory isolation component 112 may be applied to one or more specific computing processes. For example, the processes performed by memory isolation component 112 may be applied to computing process 120A, but not to computing process 120B and 120C. In other embodiments, the processes performed by memory isolation component 112 may be applied to all of the computing processes hosted by supervisor 110. For example, the processes performed by memory isolation component 112 may be applied to computing process 120A-C.

In some embodiments, memory isolation component 112 can use memory protection keys to enable or restrict supervisor 110 from accessing user space memory outside of a selected address range (e.g., the virtual addresses associated with data store 118). Memory protection keys provide a mechanism for enforcing page-based protection without modifying page tables. In particular, one or more bits in each page-table entry can be used to assign a "key" values to any given page. The key values may indicate whether a memory page is readable, writable, executable, protected (e.g., blocks reads), etc. Thus, the memory protection keys allow the kernel to selectively disable or enable access to memory pages.

In one example, memory access control module 214 can maintain two different memory protection keys for supervisor 110. The first protection key can be used to access all of the user space memory 116. The second protection key can be used for accessing selected address range only (e.g., data store 118). During normal operation, supervisor 110 can use the first protection key. In response to a system call from, for example, computing process 120A, memory access control module 214 can switch to using the second protection key. As such, during the system call, supervisor 110 will be unable to access data outside of the selected address range. Upon completion of the system call, memory access control module 214 can switch back to using the first protection key.

In some embodiments, memory isolation component 112 can switch page tables to enable or restrict supervisor 110 from accessing user space memory outside of a selected address range (e.g., the virtual addresses associated with data store 118). In some embodiments, an instruction from supervisor 110 may cause one or more physical processing devices 134 to switch from one page table structure to another page table structure. The instruction may be exposed to code executing at a user mode privilege level (e.g., non-root), a kernel privilege level (e.g., root), other privilege level, or a combination. As a result, the instruction may be invoked (e.g., called) by computing processes 120A-C, supervisor 110, or a combination thereof. In one example, the instruction may switch between multiple page table structures by updating processor configuration data in one or more control registers.

In some embodiments, memory isolation component 112 may maintain two page table structures. The first page table structure may include a first set of mapping records, where each mapping record correlates an address in user space memory and kernel space memory to an address in physical memory. The second page table structure may include a second set of mapping records, where each mapping record correlates an address in the selected address range of user space memory to an address in physical memory. During normal operation, supervisor 110 can use the first page table structure (a user space and kernel space page table). In response to a system call from, for example, computing process 120A, memory access control module 214 can perform a page table switch by switching to using the second page table structure (selected address range of user space memory page table) instead of the first page table structure. As such, during the system call, supervisor 110 will be unable to access data outside of the selected address range. Upon completion of the system call, memory access control module 214 can switch back to using the first page table structure.

Figure 3:
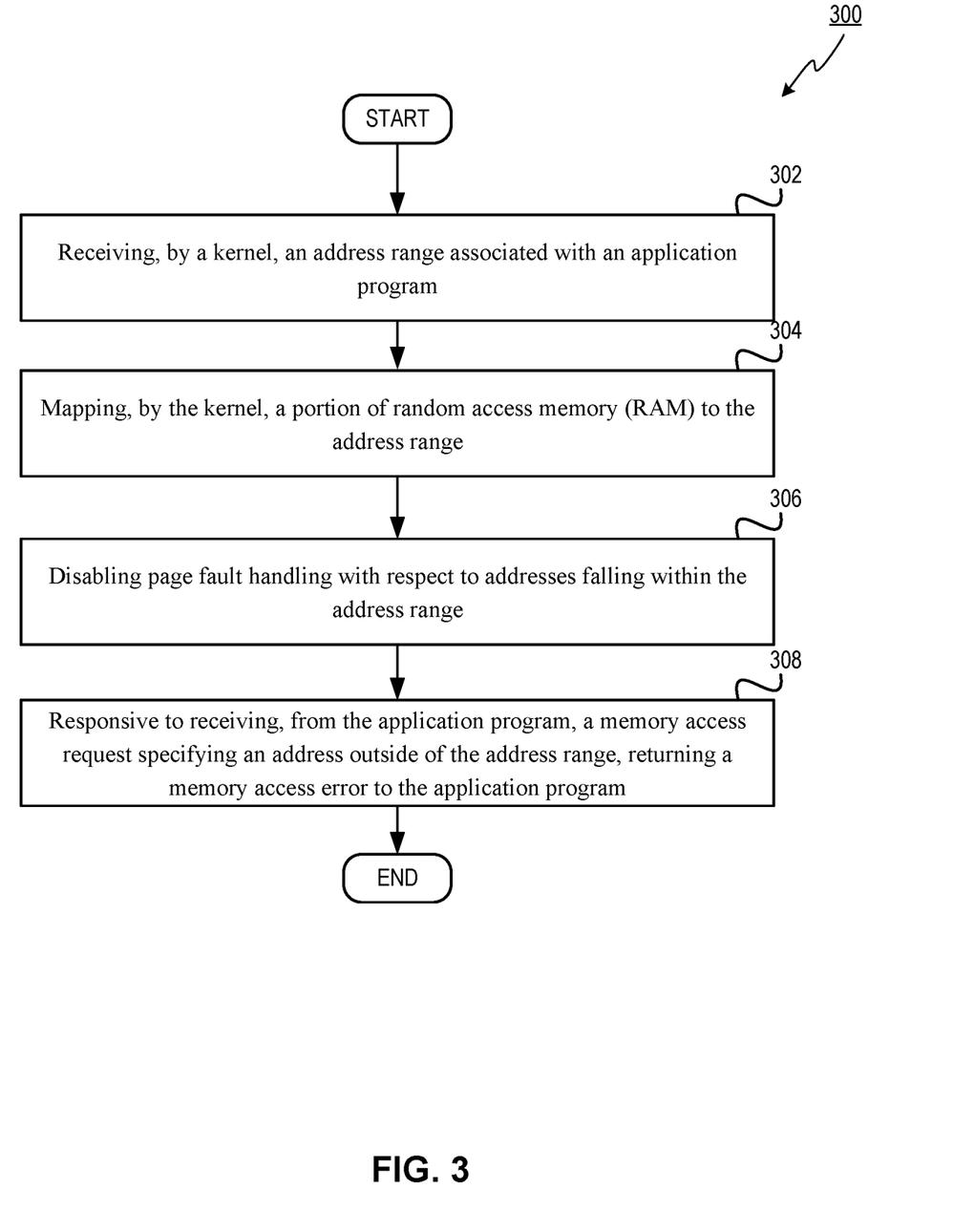
FIG. 3 depicts a flow diagram of an example method for providing memory isolation for a computing process, in accordance with one or more aspects of the present disclosure.

FIG. 3 depicts a flow diagram of an illustrative example of a method 300 for providing memory isolation for a computing process, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel as shown in FIG. 1 or by an executable code of a host machine (e.g., host operating system or firmware), a hypervisor, a virtual machine (e.g., guest operating system or virtual firmware), other executable code, or a combination thereof.

Method 300 may be performed by processing devices of a server device or a client device and may begin at block 302. At block 302, a kernel may receive an address range associate with an application program. At block 304, the kernel may map a portion of random access memory (RAM) to the address range. In some embodiments, the kernel may pin memory pages associated with the addresses falling within the address range by executing a pinning function. At block 306, the kernel may disable page fault handling with respect to addresses falling within the address range.

At block 308, responsive to receiving from the application program a memory access request specifying an address outside of the address range, the kernel may return a memory access error to the application program. Alternatively, responsive to receiving, from the application program, a memory access request specifying an address within the address range, the kernel may process the memory request (e.g., program data to memory associated with the address range, retrieve data from memory associated with the address range, etc.). Responsive to completion of the processing of the memory request, the kernel may enable page fault handling with respect to the address falling within the address range. In some embodiments, responsive to processing the memory access request, the kernel may page out data (to a hard disk) associated with the memory access request (e.g., a write request).

In some embodiments, the kernel may maintain a first memory protection key and a second memory protection key. The first memory protection key may be used to access user space memory while the second memory protection key may be used to access only the address range in the user space memory. Responsive to receiving, from the application program, the memory access request, the kernel may switch from using the first protection key to using the second protection key.

In some embodiments, the kernel may maintain a first page table structure and a second page table structure. The first page table structure may include a first set of mapping records, where each mapping record of the first set correlates an address in user space memory to an address in physical memory. The second page table structure may include a second set of mapping records, where each mapping record of the second set correlates an address in the address range of the user space memory to an address in the physical memory. Responsive to receiving, from the application program, the memory access request, the kernel may switch from using the first page table structure to using the second page table structure. Responsive to completing the operations described herein above with references to block 408, the method may terminate.

Figure 4:
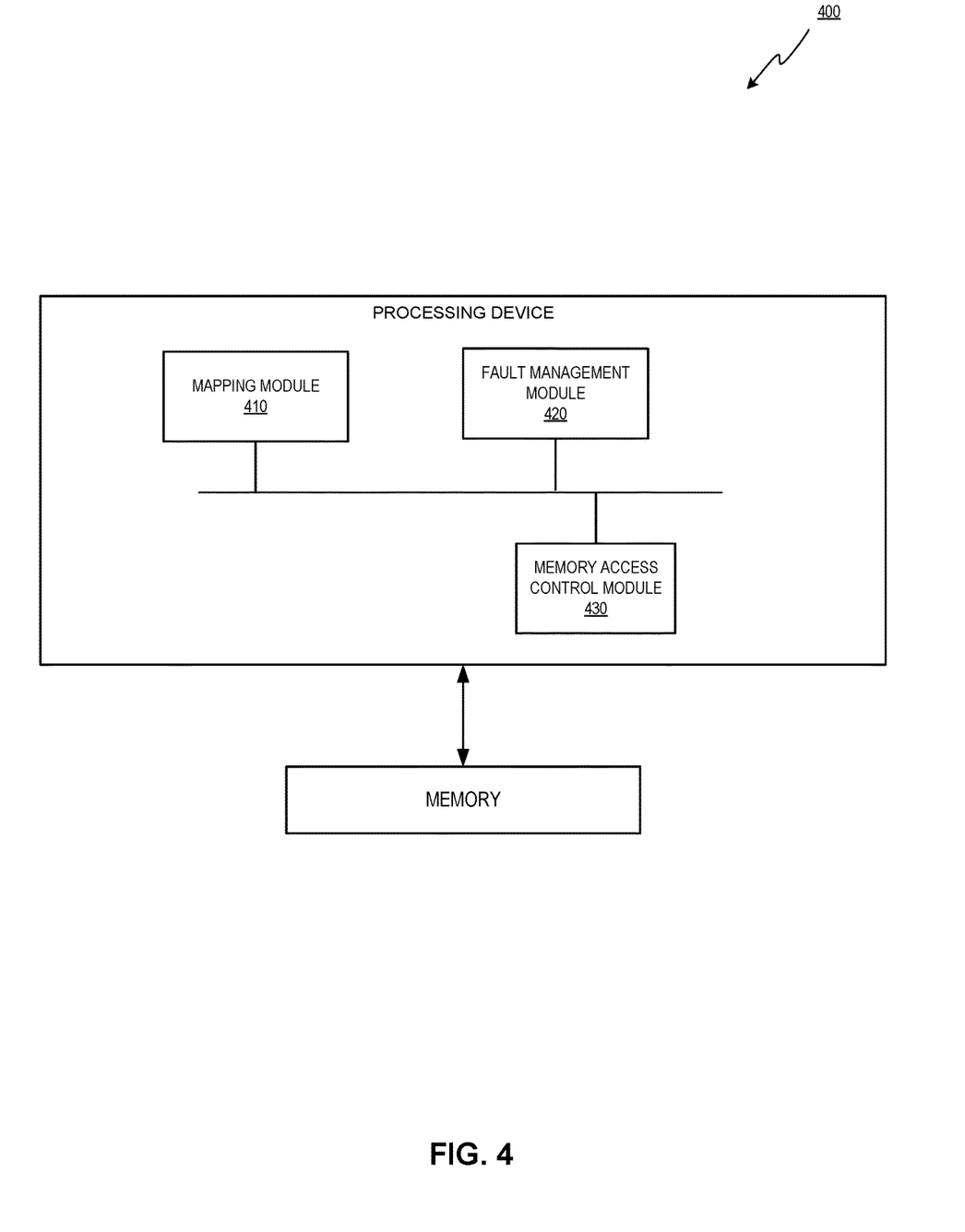
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to supervisor 110 and computer system 100 and may include one or more processing devices and one or more memory devices. In the example shown, computer system 400 may include mapping module 410, fault management module 420, and memory access control module 430.

Mapping module 410 may receive an address range associate with an application program. The mapping module may then map a portion of random access memory (RAM) to the address range. In some embodiments, mapping module 410 may pin memory pages associated with the addresses falling within the address range by executing a pinning function.

Fault management module 420 may disable page fault handling with respect to addresses falling within the address range. Responsive to receiving from the application program a memory access request specifying an address outside of the address range, memory access control module 430 may return a memory access error to the application program. Alternatively, responsive to receiving, from the application program, a memory access request specifying an address within the address range, memory access control module 430 may process the memory request (e.g., program data to memory associated with the address range, retrieve data from memory associated with the address range, etc.). Responsive to completion of the processing of the memory request, memory access control module 430 may enable page fault handling with respect to the address falling within the address range. In some embodiments, responsive to processing the memory access request, memory access control module 430 may page out data (to a hard disk) associated with the memory access request (e.g., a write request).

In some embodiments, memory access control module 430 may maintain a first memory protection key and a second memory protection key. The first memory protection key may be used to access user space memory while the second memory protection key may be used to access only the address range in the user space memory. Responsive to receiving, from the application program, the memory access request, memory access control module 430 may switch from using the first protection key to using the second protection key.

In some embodiments, memory access control module 430 may maintain a first page table structure and a second page table structure. The first page table structure may include a first set of mapping records, where each mapping record of the first set correlates an address in user space memory to an address in physical memory. The second page table structure may include a second set of mapping records, where each mapping record of the second set correlates an address in the address range of the user space memory to an address in the physical memory. Responsive to receiving, from the application program, the memory access request, memory access control module 430 may switch from using the first page table structure to using the second page table structure.

Figure 5:
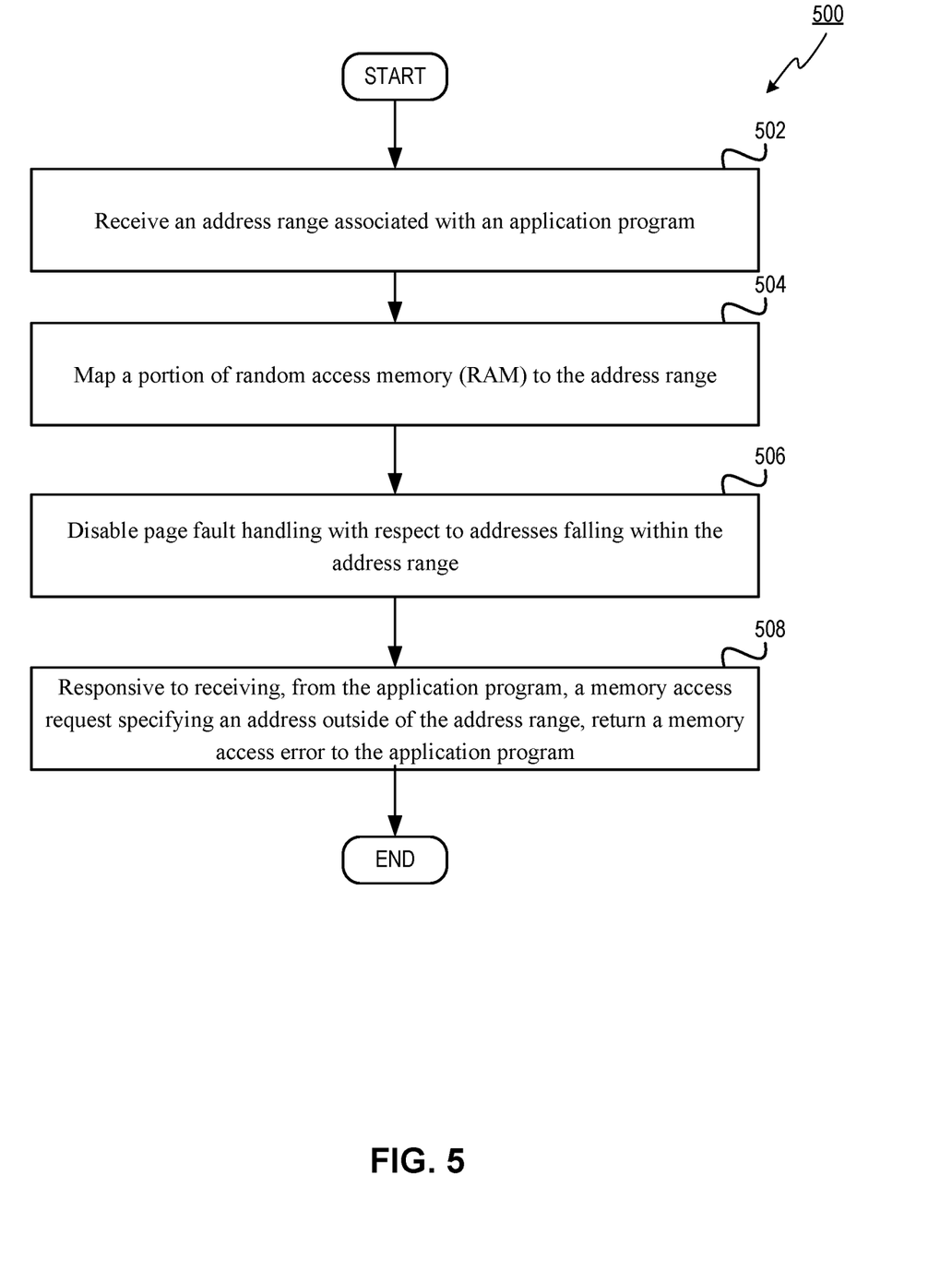
FIG. 5 depicts a flow diagram of another example method for providing memory isolation for a computing process, in accordance with one or more aspects of the present disclosure.

FIG. 5 depicts a flow diagram of one illustrative example of a method 500 for providing memory isolation for a computing process, in accordance with one or more aspects of the present disclosure. Method 500 may be similar to method 500 and may be performed in the same or a similar manner as described above in regards to method 500. Method 500 may be performed by processing devices of a server device or a client device and may begin at block 502.

At block 502, a processing device may receive an address range associate with an application program. At block 504, the processing device may map a portion of random access memory (RAM) to the address range. In some embodiments, the kernel may pin memory pages associated with the addresses falling within the address range by executing a pinning function. At block 506, the processing device may disable page fault handling with respect to addresses falling within the address range.

At block 508, responsive to receiving from the application program a memory access request specifying an address outside of the address range, the processing device may a memory access error to the application program. Alternatively, responsive to receiving, from the application program, a memory access request specifying an address within the address range, the processing device may process the memory request (e.g., program data to memory associated with the address range, retrieve data from memory associated with the address range, etc.). Responsive to completion of the processing of the memory request, the processing device may enable page fault handling with respect to the address falling within the address range. In some embodiments, responsive to processing the memory access request, the processing device may page out data (to a hard disk) associated with the memory access request (e.g., a write request).

In some embodiments, the processing device may maintain a first memory protection key and a second memory protection key. The first memory protection key may be used to access user space memory while the second memory protection key may be used to access only the address range in the user space memory. Responsive to receiving, from the application program, the memory access request, the kernel may switch from using the first protection key to using the second protection key.

In some embodiments, the processing device may maintain a first page table structure and a second page table structure. The first page table structure may include a first set of mapping records, where each mapping record of the first set correlates an address in user space memory to an address in physical memory. The second page table structure may include a second set of mapping records, where each mapping record of the second set correlates an address in the address range of the user space memory to an address in the physical memory. Responsive to receiving, from the application program, the memory access request, the processing device may switch from using the first page table structure to using the second page table structure. Responsive to completing the operations described herein above with references to block 508, the method may terminate.

Figure 6:
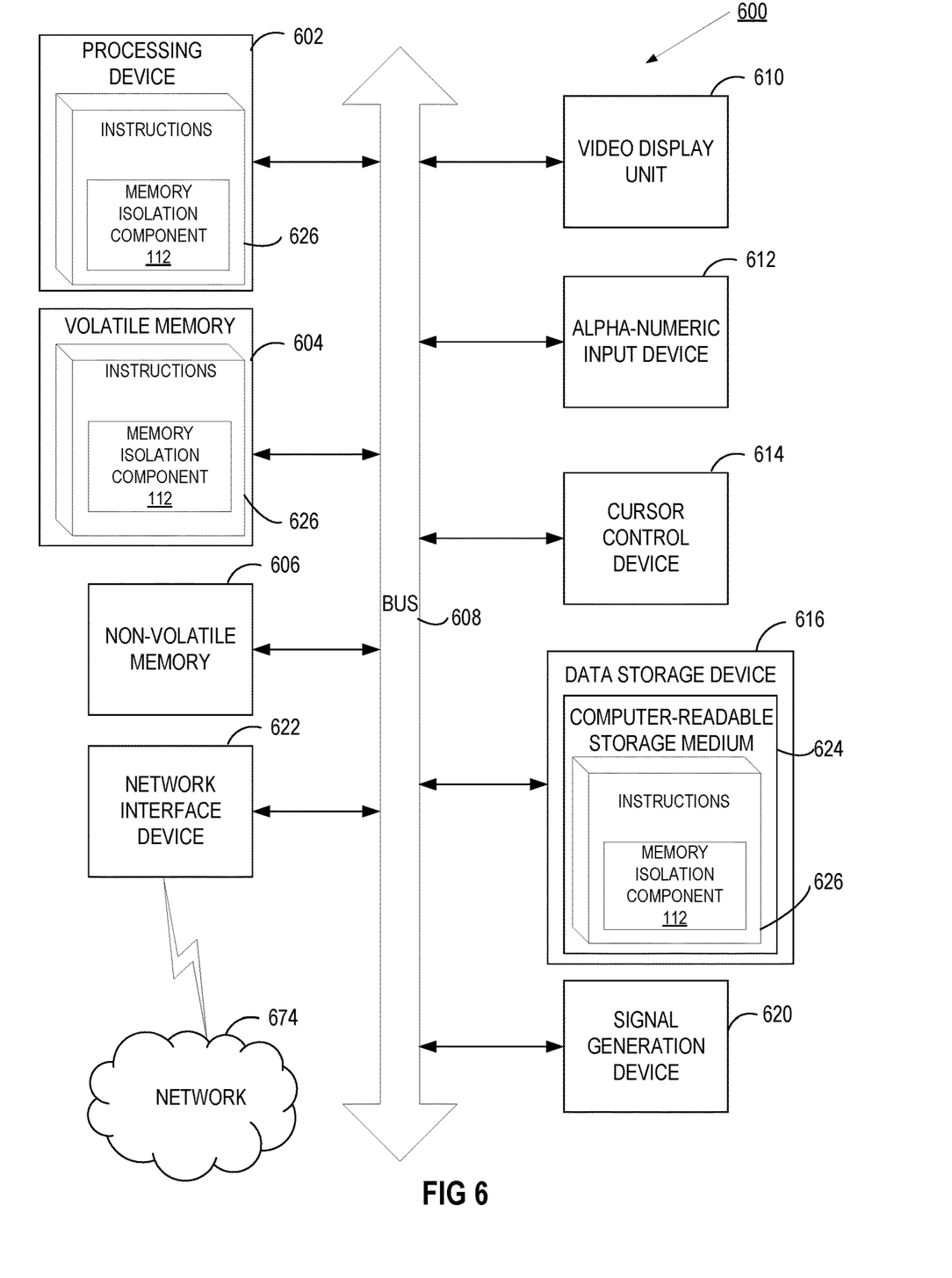
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for memory isolation component 112, and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a kernel, an address range associated with a data store of an application program;
mapping, by the kernel, a portion of random access memory (RAM) to the address range;
disabling page fault handling with respect to addresses falling within the address range;
maintaining a first memory protection key and a second memory protection key, wherein the first memory protection key enables accessing user space memory and the second memory protection key is limited to the address range in the user space memory;
responsive to receiving, from the application program, a memory access request, switching from using the first protection key to the second protection key; and responsive to determining that the memory access request specifies an address outside of the address range, returning a memory access error to the application program.

2. The method of claim 1, further comprising:
responsive to receiving, from the application program, a memory access request specifying an address within the address range, processing the memory request.

3. The method of claim 1, further comprising:
responsive to returning the error to the application program, enabling page fault handling with respect to the address.

4. The method of claim 1, further comprising:
pinning one or more memory pages mapped to addresses falling within the address range.

5. The method of claim 1, further comprising:
responsive to processing the memory access request, paging out data associated with the memory access request.

6. The method of claim 1, further comprising:
maintaining a first page table and a second page table, wherein the first page table comprises a set of records, wherein each record of the set of records maps a virtual address in the address range to an address in physical memory,
responsive to receiving, from the application program, the memory access request, switching from the first page table to the second page table.

7. A system, comprising:
a memory;
a processing device operatively coupled to the memory, the processing device configured to:
receive an address range associated with an application program;
map a portion of random access memory (RAM) to the address range;
disable page fault handling with respect to addresses falling within the address range;
maintain a first memory protection key and a second memory protection key, wherein the first memory protection key enables accessing user space memory and the second memory protection key is limited to the address range in the user space memory;
responsive to receiving, from the application program, a memory access request, switch from using the first protection key to the second protection key; and
responsive to determining that the memory access request specifies an address outside of the address range, return a memory access error to the application program.

8. The system of claim 7, further comprising the processing device configured to:
responsive to receiving, from the application program, a memory access request specifying an address within the address range, process the memory request.

9. The system of claim 7, further comprising the processing device configured to:
responsive to returning the error to the application program, enable page fault handling with respect to the address falling within the address range.

10. The system of claim 7, further comprising the processing device configured to:
pin one or more memory pages mapped to addresses falling within the address range.

11. The system of claim 7, further comprising the processing device configured to:
responsive to processing the memory access request, page out data associated with the memory access request.

12. The system of claim 7, further comprising the processing device configured to:
maintain a first page table and a second page table, wherein the first page table comprises a set of records, wherein each record of the set of records maps a virtual address in the address range to an address in physical memory,
responsive to receiving, from the application program, the memory access request, switch from the first page table to the second page table.

13. A non-transitory machine-readable storage medium storing instructions that cause a processing device to:
receive an address range associated with an application program;
map a portion of random access memory (RAM) to the address range;
disable page fault handling with respect to addresses falling within the address range;
maintain a first memory protection key and a second memory protection key, wherein the first memory protection key enables accessing user space memory and the second memory protection key is limited to the address range in the user space memory;
responsive to receiving, from the application program, a memory access request, switch from using the first protection key to the second protection key; and
responsive to determining that the memory access request specifies an address outside of the address range, return a memory access error to the application program.

14. The non-transitory machine-readable storage medium of claim 13, further comprising the processing device configured to:
responsive to receiving, from the application program, a memory access request specifying an address within the address range, processing the memory request.

15. The non-transitory machine-readable storage medium of claim 13, further comprising the processing device configured to:
responsive to returning the error to the application program, enabling page fault handling with respect to the address falling within the address range.

16. The non-transitory machine-readable storage medium of claim 13, further comprising the processing device configured to:
pin one or more memory pages mapped to addresses falling within the address range.

17. The non-transitory machine-readable storage medium of claim 13, further comprising the processing device configured to:
maintain a first page table and a second page table, wherein the first page table comprises a set of records, wherein each record of the set of records maps a virtual address in the address range to an address in physical memory,
responsive to receiving, from the application program, the memory access request, switch from the first page table to the second page table.

* * * * *